US006090734A

United States Patent [19]
Tsipursky et al.

[11] Patent Number: 6,090,734
[45] Date of Patent: Jul. 18, 2000

[54] PROCESS FOR PURIFYING CLAY BY THE HYDROTHERMAL CONVERSION OF SILICA IMPURITIES TO A DIOCTAHEDRAL OR TRIOCTAHEDRAL SMECTITE CLAY

[75] Inventors: Semeon J. Tsipursky, Lincolnwood; Don D. Eisenhour, Grayslake; Gary W. Beall, McHenry; Marek R. Mosiewicz, Glenview, all of Ill.

[73] Assignee: AMCOL International Corporation, Arlington Heights, Ill.

[21] Appl. No.: 09/040,638

[22] Filed: Mar. 18, 1998

[51] Int. Cl.[7] .................................................. C09C 1/42
[52] U.S. Cl. .................. 501/141; 106/486; 106/286.1; 106/286.5; 106/286.6; 106/286.7; 106/287.34; 423/328.1; 423/331; 423/332
[58] Field of Search .......................... 501/141; 106/486, 106/286.1, 286.5, 286.6, 286.7, 286.8, 287.34; 423/328.1, 328.2, 331, 332

[56] References Cited

U.S. PATENT DOCUMENTS

| | | | |
|---|---|---|---|
| 2,035,546 | 3/1936 | Hamilton | 167/24 |
| 3,252,757 | 5/1966 | Granquist | 423/331 |
| 3,419,460 | 12/1968 | Ure | 161/162 |
| 3,419,517 | 12/1968 | Hedrick et al. | 260/37 |
| 3,515,626 | 6/1970 | Duffield | 161/162 |
| 3,572,500 | 3/1971 | Kouloheris | 209/5 |
| 3,599,879 | 8/1971 | Clark | 241/4 |
| 3,773,708 | 11/1973 | Takahashi et al. | 260/41 R |
| 3,795,650 | 3/1974 | Burns | 260/33.4 R |
| 3,844,978 | 10/1974 | Hickson | 423/331 |
| 3,855,147 | 12/1974 | Granquist | 423/328.1 |
| 3,879,283 | 4/1975 | Mercade | 209/5 |
| 3,892,655 | 7/1975 | Hickson | 208/111 |
| 3,912,532 | 10/1975 | Simone | 106/308 N |
| 3,929,678 | 12/1975 | Laughlin et al. | 252/526 |
| 4,018,673 | 4/1977 | Hughes et al. | 209/5 |
| 4,054,537 | 10/1977 | Wright et al. | 423/331 |
| 4,125,411 | 11/1978 | Lyons | 106/291 |
| 4,210,572 | 7/1980 | Herman et al. | 260/40.4 |
| 4,251,576 | 2/1981 | Osborn et al. | 428/331 |
| 4,315,879 | 2/1982 | Pfuhl et al. | 264/117 |
| 4,400,485 | 8/1983 | Mukamal et al. | 524/444 |
| 4,431,755 | 2/1984 | Weber et al. | 523/203 |
| 4,434,075 | 2/1984 | Mardis et al. | 252/315.2 |
| 4,472,538 | 9/1984 | Kamigaito et al. | 523/202 |
| 4,500,670 | 2/1985 | McKinley et al. | 524/445 |
| 4,546,145 | 10/1985 | Kishida et al. | 524/780 |
| 4,600,744 | 7/1986 | Libor et al. | 524/446 |
| 4,613,542 | 9/1986 | Alexander | 428/290 |
| 4,624,982 | 11/1986 | Alexander | 524/446 |
| 4,739,007 | 4/1988 | Okada et al. | 524/789 |
| 4,749,676 | 6/1988 | Blumenthal et al. | 423/327 |
| 4,789,403 | 12/1988 | Rice | 106/417 |
| 4,798,766 | 1/1989 | Rice | 428/404 |

(List continued on next page.)

FOREIGN PATENT DOCUMENTS

| | | |
|---|---|---|
| 0 205 281 A3 | 12/1986 | European Pat. Off. . |
| 0 335 653 A1 | 10/1989 | European Pat. Off. . |
| 0358415 A1 | 3/1990 | European Pat. Off. . |
| 0 479 031 A1 | 4/1992 | European Pat. Off. . |
| 0 548 940 A1 | 6/1993 | European Pat. Off. . |
| 0 645 181 A2 | 3/1995 | European Pat. Off. . |
| 0 761 739 A1 | 2/1997 | European Pat. Off. . |
| 2 526 779 | 11/1983 | France . |
| 1 642 122 | 7/1970 | Germany . |
| 1 146 668 | 3/1969 | United Kingdom . |
| 1 565 362 | 4/1980 | United Kingdom . |
| WO 93/04117 | 3/1993 | WIPO . |
| WO 93/04118 | 3/1993 | WIPO . |
| WO 93/11190 | 6/1993 | WIPO . |
| WO 96 37286 | 11/1996 | WIPO . |

OTHER PUBLICATIONS

C. W. Francis, "Adsorption of Polyvinylpyrrolidone on Reference Clay Minerals", Soil Science, vol. 115, No. 1, 1973, pp. 40–54 (no month).
A. Usuki, et al., "Synthesis of nylon 6–clay hybrid", J. Mater. Res. vol. 8, No. 5, May 1993, pp. 1179–1184.
Y. Kojima, et al., "Mechanical Properties of Nylon 6–Clay Hybrid", J. Mater. Res., vol. 8, No. 5, May 1993, pp. 1185–1189.
K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152 (no month).
R. Levy, et al., "Interlayer Adsorption of Polyvinylpyrrolidone On Montmorillonite", Journal of Colloid and Interface Science, vol. 50, No. 3, Mar. 1975, pp. 442–450.
D.J. Greenland, "Adsorption of Polyvinyl Alcohols By Montmorillonite", Journal of Colloid Science, 18, (1963) pp. 647–664 (no month).
R.A. Vaia, et al., "Synthesis and Properties of Two–Dimensional Nanostructures by Direct Intercalation of Polymer Melts in Layered Silicates", Chem. Mater. 1993, 5, pp. 1694–1696 (no month).

(List continued on next page.)

*Primary Examiner*—Michael Marcheschi
*Attorney, Agent, or Firm*—Marshall, O'Toole, Gerstein, Murray & Borun

[57] ABSTRACT

A hydrothermal reaction which dissolves the amorphous silica and the crystalline silica impurities contained in a recovered, naturally occurring montmorillonite clay, and subsequently converts the dissolved silicas into a dioctahedral and/or trioctahedil smectite clay. The dissolution of silica is accomplished by adjusting the pH of an aqueous slurry of the recovered clay to a value of about 8.5 to about 10.0, preferably about 9.0 to about 9.5, at a temperature of at least about 150° C., preferably about 180° C. to about 250° C., more preferably about 190° C. to about 235° C. Dissolved silica reacts with stoichiometric amounts of aluminum and/or magnesium and/or sodium added to the slurry, while at a temperature of at least about 150° C., preferably about 185° C. to about 250° C., and at a pressure of at least about 200 bars, to synthesize a dioctahedral smectite clay from the dissolved silica; or the dissolved silica reacts with stoichiometric amounts of lithium and/or magnesium and/or sodium added to the slurry, at the same conditions, to form a trioctahedral smectite clay.

32 Claims, 3 Drawing Sheets

U.S. PATENT DOCUMENTS

| | | | |
|---|---|---|---|
| 4,810,734 | 3/1989 | Kawasumi et al. | 523/216 |
| 4,842,651 | 6/1989 | Ravet et al. | 106/487 |
| 4,849,006 | 7/1989 | Knudson, Jr. | 71/64.11 |
| 4,875,762 | 10/1989 | Kato et al. | 350/357 |
| 4,889,885 | 12/1989 | Usuki et al. | 524/443 |
| 4,894,411 | 1/1990 | Okada et al. | 524/710 |
| 4,920,171 | 4/1990 | Hutton, Jr. et al. | 524/446 |
| 5,032,546 | 7/1991 | Giannelis et al. | 501/3 |
| 5,032,547 | 7/1991 | Giannelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 528/425.5 |
| 5,393,340 | 2/1995 | Slepetys et al. | 106/484 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,522,924 | 6/1996 | Smith et al. | 106/488 |
| 5,552,469 | 9/1996 | Beall et al. | 524/445 |
| 5,578,672 | 11/1996 | Beall et al. | 624/446 |
| 5,624,488 | 4/1997 | Forbus et al. | 106/484 |
| 5,667,886 | 9/1997 | Gough et al. | 428/331 |
| 5,698,624 | 12/1997 | Beall et al. | 524/445 |
| 5,760,106 | 6/1998 | Pinnavaia et al. | 523/209 |

OTHER PUBLICATIONS

R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156 (no month).

A. Akelah, et al., "Synthesis and Characterization of Epoxyphilic montmorillonites", Clay Minerals (1994) 29, pp. 169–178 (no month).

C.E. Clapp, et al., "Adsorption Studies Of A Dextran On Montmorillonite", Trans. 9th Int. Cong. Soil Sci., 1968, vol. 1, pp. 627–634 (no month).

H.G.G. Dekking, "Preparation And Properties Of Some Polymer–Clay Compounds", Clays and Clay Minerals, 1964, 12, pp. 603–616 (no month).

A. Usuki, et al., "Characterization and Properties of Nylon 6—Clay Hybrid", (source and date unknown), pp. 651–652.

G.W. Brindley, et al., "Preparation And Solvatio Properties Of Some Variable Charge Montmorillonites", Clays and Clay Minerals, 1971, vol. 18, pp. 399–404 (no month).

A. Okada, et al., "A Solid State NMR Study On Crystalline Forms Of Nylon 6", Journal of Applied Polymer Science, (1989), vol. 37, pp. 1363–1371 (no month).

A. Usuki, et al., Swelling Behavior Of Montmorillonite Cation Exchanged For ω–Amino Acids By ε–Caprolactam, J. Mater. Res., vol. 8, No. 5, May 1993, pp. 1174–1178.

Y. Kojima, ete al., "One–Pot Synthesis Of Nylon 6–Clay Hybrid", Journal of Polymer Science: Part A: Polymer Chemistry, vol. 31, (1993), pp. 1755–1758 (no month).

Y. Kojima, et al., "Fine Structure Of Nylon–6–Clay Hybrid", Journal of Polymer Science: Part B: Polymer Physics, vol. 32 (1994), pp. 625–630 (no month).

B.K.G. Theng, "Clay–Polymer interactions: Sumary And Perspectives", Clays and Clay Minerals, vol. 30, No. 1 (1982) pp. 1–9 (no month).

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", *Clay Science*, vol. 7, 1989 Tokyo, Japan, pp. 243–251 (no month).

Wu, et al., "Structural, thermal, and electrical characterization of layered nanocomposites derived from sodium–montmorillonite and polyethers", *Chemical Abstracts*, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Yano, et al., "Syntheis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558 (no month).

Sanchez Camazano, M. et al., "Factors influencing interactions of organophosphorus pesticides with montmorillonite", *Chemical Abstracts*, vol. 98, No. 19, May 9, 1983, Columbus, Ohio, US, Abstract No. 156367.

T. Lan, et al., "Clay–Epoxy Nanocomposites:Relationships Between Reinforcement Properties And The Extent Of Clay Layer Exfoliation",*Polym. Mater. Sc. Eng.*, 73, pp. 296–297 (1995). (no month).

Nakazawa, et al., "Montmorillonite Crystallization From Glass", *Clay Science*, pp. 59–68 (1991) (no month).

Tomita, et al., "Synthesis Of Smectite From Volcanic Glass At Low Temperature", *Clays and Clay Minerals*, vol. 41, No. 6, pp. 655–661 (1993) (no month).

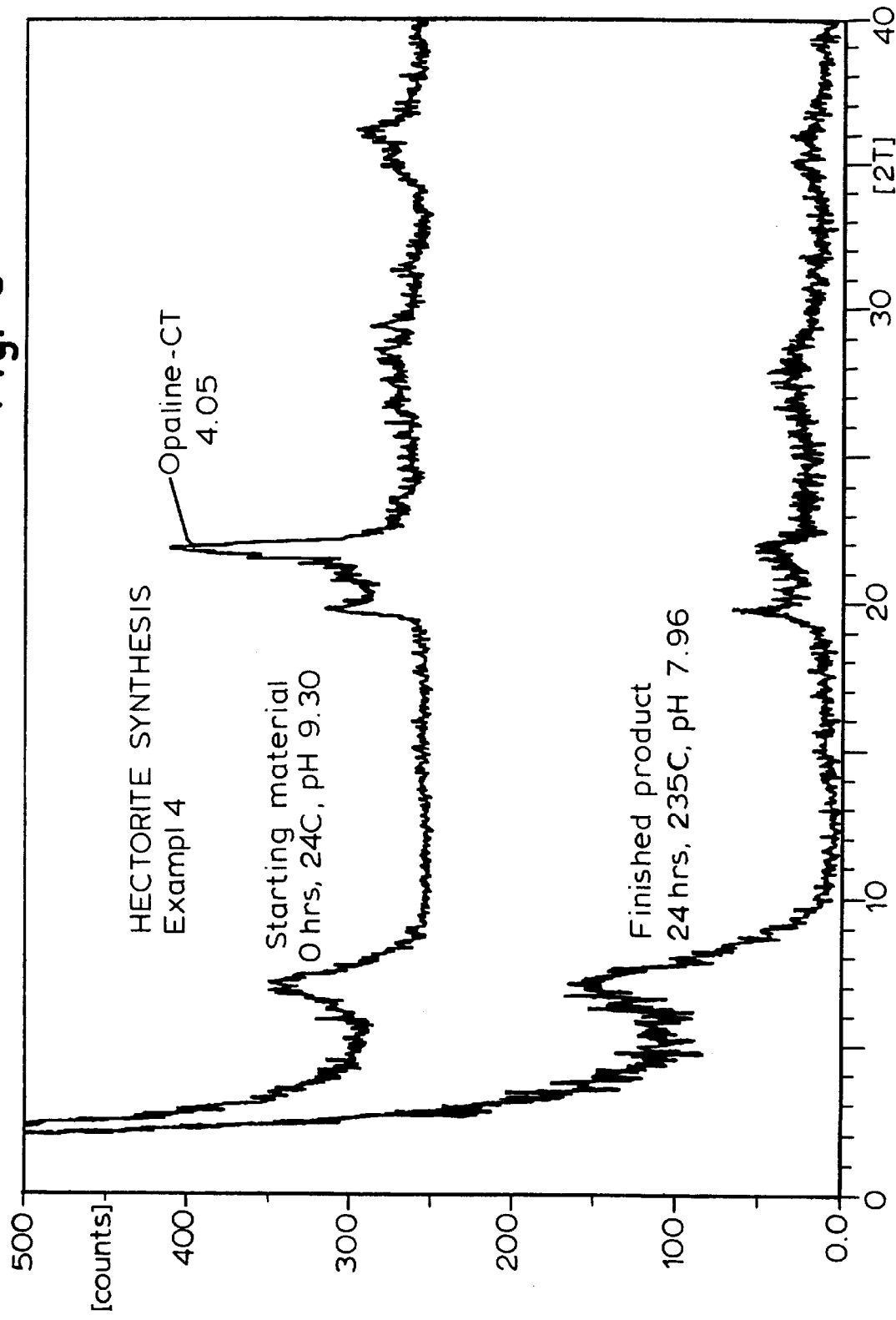

PROCESS FOR PURIFYING CLAY BY THE HYDROTHERMAL CONVERSION OF SILICA IMPURITIES TO A DIOCTAHEDRAL OR TRIOCTAHEDRAL SMECTITE CLAY

FIELD OF THE INVENTION

The present invention is directed to a method of purifying a dioctahedral and/or trioctahedral smectite clay-containing composition that includes a crystalline silica ($SiO_2$) and/or amorphous silica ($SiO_2$) fraction by converting the silica fraction to a dioctahedral smectite clay, such as a montmorillonite clay, or a trioctahedral smectite clay, such as hectorite. More particularly, the present invention is directed to a hydrothermal process for synthesizing a dioctahedral smectite clay, such as a montmorillonite clay, or synthesizing a trioctahedral smectite clay, such as hectorite, from $SiO_2$ by the addition of at least a stoichiometric amount of sodium, magnesium, lithium and/or aluminum to $SiO_2$, at a temperature of at least about 150° C., a pressure of at least about 80 psig, preferably about 100 psig to about 300 psig, and at a pH of about 8.5 to about 10.0, preferably about 9.0 to about 9.5.

BACKGROUND OF THE INVENTION

Very often smectite clays, such as montmoriionite clays, are formed naturally by the alteration of volcanic glass (sodium, magnesium aluminosilicate) under hydrothermal conditions (heat and pressure). The average crystal-chemical formula for montmorillonite is $E_{0.33}(Al_{1.67}Mg_{0.33})Si_4O_{10}(OH)_2 \cdot nH_2O$, wherein E=Na, Ca, and/or Mg and n=1–80. Almost all montmorillonite deposits include non-montmorillonite mineralogical phases, such as quartz (crystalline silica) or amorphous silica contaminants, commonly in amounts of about 10% by weight to as much as about 50% by weight. Prior art techniques for removal of silica contaminants include removing the silica by solubilizing the silica at high pH and separating the solid montmorillonite clay in a more pure form. The removal of such contaminants is a time consuming and expensive process and results in wasting the $SiO_2$ portion of the starting material.

In accordance with the present invention, a method has been found to convert the silica fraction of a recovered montmorillonite clay/silica deposit to a dioctahedral smectite clay, such as a montmorillonite clay, or to a trioctahedral smectite clay, such as hectorite, thereby obtaining a relatively pure dioctahedral and/or trioctahedral smectite clay without wasting the silica impurities recovered with the clay deposit.

While others have synthesized smectites or montmorillonites from sodium, magnesium aluminosilicate glass in a hydrothermal process, "Montmorillonite Crystallization From Glass", Nakazawa, et al., *Clay Science*, 8, 59–68 (1991), and at atmospheric pressure and low temperature, "Synthesis Of Smectite From Volcanic Glass At Low Temperature", Tomita, et al., *Clays and Clay Minerals*, Vol. 41, No. 6, 655–661(1993), these synthesis reactions are reactions of a glass material (recovered volcanic glass material, or glass material prepared by fusion of a mixture of oxides and carbonates, e.g., $SiO_2$, $Al_2O_3$, MgO, and $Na_2CO_3$) with water at various NaOH concentrations, and required 3 to 7 days for hydration of the starting materials, without the addition of metal ions.

In accordance with one embodiment of the present invention, $SiO_2$ is converted to essentially pure dioctahedral smectite clay, containing less than about 5% by weight non-clay impurities, preferably less than about 2% by weight non-clay impurities, more preferably less than about 1% by weight non-clay impurities, e.g., to montmorillonite, beidellite and/or nontronite. The $SiO_2$ is altered to the structure of a dioctahedral smectite clay, preferably montmorillonite, by the addition of Al, Mg and/or Na ions to convert crystalline silica and/or amorphous silica to a dioctahedral smectite clay, such as a montmorillonite.

In accordance with another embodiment of the present invention, $SiO_2$ is converted to essentially pure trioctahedral clay, such as hectorite, containing less than about 5% by weight non-clay impurities, preferably less than about 2% by weight non-clay impurities, more preferably less than about 1% by weight non-clay impurities. The $SiO_2$ is altered to the structure of a trioctahedral clay, preferably hectorite, by the addition of Li, Mg and/or Na ions to convert crystalline silica and/or amorphous silica to a trioctahedral smectite clay, such as hectorite.

SUMMARY OF THE INVENTION

In brief, the present invention is directed to a process for converting a silica fraction of a recovered, naturally occurring dioctahedral or trioctahedral smectite clay, such as a montmorillonite clay or a hectorite clay, respectively, to a dioctahedral smectite clay or a trioctahedral smectite clay, to obtain a purified dioctahedral and/or trioctahedral smectite clay without separating or wasting the silica fraction in the recovered clay composition. While it is well known that the naturally occurring smectite clays contain crystalline impurities, i.e., quartz, feldspar, mica and the like, it is not well known that many naturally occurring smectite clay deposits contain relatively large amounts of amorphous silica. Sodium bentonite and calcium bentonite clay deposits, in particular, have been found to contain up to about 50% by weight amorphous silica. Such amorphous silica fractions of sodium bentonite and calcium bentonite are particularly deleterious when the clay is intercalated and exfoliated for use, for example, as a nanocomposite filler in polymers, e.g., for uses as disclosed in this assignee's U.S. Pat. Nos. 5,552,469; 5,578,672, and 5,698,624, hereby incorporated by reference. Amorphous silica impurities incorporated with exfoliated montmorillonite clay into polymers, together with exfoliated platelets of a phyllosilicate, such as montmorillonite clay, substantially lower the impact resistance and elongation and increase the opacity or haze and increase gas permeability of the resulting nanocomposite.

The process of the present invention is directed to a hydrothermal reaction which dissolves the amorphous silica and the crystalline silica impurities contained in a recovered, naturally occurring smectite clay, such as a montmorillonite clay, and subsequently converts the dissolved silica into a dioctahedral or trioctahedral smectite clay. The dissolution of silica is accomplished by adjusting the pH of an aqueous slurry of the recovered $SiO_2$-containing clay composition to a value of about 8.5 to about 10.0, preferably about 9.0 to about 9.5, at a temperature of at least about 150° C., preferably about 180° C. to about 250° C., more preferably about 190° C. to about 235° C. Dissolved silica reacts with stoichiometric amounts of aluminum and/or magnesium and/or sodium added to the slurry to form a dioctahedral smectite clay; or stoichiometric amounts of lithium and/or magnesium and/or sodium are added to the slurry to form a trioctahedral smectite clay, while at a temperature of at least about 150° C., preferably about 185° C. to about 250° C., and at a pressure of at least about 80 psig, to synthesize the dioctahedral or trioctahedral smectite clay.

The average crystal chemical formulas for the preferred dioctahedral smectite clays are as follows:

Montmorillonite:

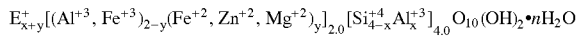
$$E^+_{x+y}[(Al^{+3}, Fe^{+3})_{2-y}(Fe^{+2}, Zn^{+2}, Mg^{+2})_y]_{2.0}[Si^{+4}_{4-x}Al^{+3}_x]_{4.0}O_{10}(OH)_2 \cdot nH_2O$$

wherein E=Na, 0.5 Ca and/or 0.5 Mg, and n=1 to 80 usually:

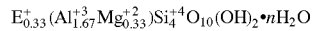
$$E^+_{0.33}(Al^{+3}_{1.67}Mg^{+2}_{0.33})Si^{+4}_4O_{10}(OH)_2 \cdot nH_2O$$

wherein E=Na, 0.5 Ca and/or 0.5 Mg, and n=1 to 80

Beidellite:

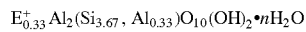
$$E^+_{0.33}Al_2(Si_{3.67}, Al_{0.33})O_{10}(OH)_2 \cdot nH_2O$$

wherein E=Na, Ca, and/or Mg and n=1 to 80

Nontronite:

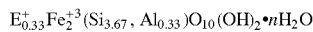
$$E^+_{0.33}Fe^{+3}_2(Si_{3.67}, Al_{0.33})O_{10}(OH)_2 \cdot nH_2O$$

wherein E=Na, Ca, and/or Mg and n=1 to 80

The average crystal chemical formula for a trioctahedral smectite clay, such as hectorite, is as follows:

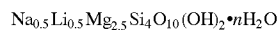
$$Na_{0.5}Li_{0.5}Mg_{2.5}Si_4O_{10}(OH)_2 \cdot nH_2O$$

wherein n=1 to 80

Common clay impurities contained within deposits of the above clays are as follows:

| | | |
|---|---|---|
| Albite | $NaAlSi_3O_8$ | |
| Anorthite | $CaAl_2Si_2O_8$ | |
| Orthoclase | $KAlSi_3O_8$ | |
| Biotite | $K(Mg,Fe)_3(AlSi_3O_{10})(OH)_2$ | |
| Muscovite | $KAl_2(AlSi_3O_{10})(OH)_2$ | |
| Calcite | $CaCO_3$ | |
| Dolomite | $CaMg(CO_3)_2$ | |
| Quartz | $SiO_2$ | |
| Opaline-CT | $SiO_2 \cdot nH_2O$ | n = 1 to 80 |
| Gypsum | $CaSO_4 \cdot 2H_2O$ | |

The pH is important since at below about 8.5, the reaction is far too slow and at a pH above about 10.0, zeolite material is formed rather than a dioctahedral or trioctahedral smectite clay. In order to synthesize a dioctahedral smectite clay from the dissolved silica, stoichiometric amounts of sodium, aluminum and/or magnesium are added to an aqueous solution of silica, with or without a dioctahedral smectite clay recovered with the silica, in a pressurized reactor at elevated temperature. This process can essentially remove all silica and produce in its place a dioctahedral smectite clay. In order to synthesize a trioctahedral smectite clay from the dissolved silica, stoichiometric amounts of sodium, lithium and/or magnesium are added to an aqueous solution of silica, with or without a dioctahedral or trioctahedral smectite clay recovered with the silica, in a pressurized reactor at elevated temperature.

Accordingly, one aspect of the present invention is to provide a method of converting impurities of silica to a dioctahedral or trioctahedral smectite clay, such as a montmorillonite or hectorite clay, by dissolving the silica, adding metal ions to approximate the stoichiometry of a dioctahedral or trioctahedral smectite clay, preferably in the form of water-soluble hydroxides and/or water-soluble oxides or water-soluble acetates, and reacting the added metal ions with the dissolved silica, under heat and pressure, to form the dioctahedral or trioctahedral smectite clay, such as a montmorillonite or hectorite clay, respectively.

Another aspect of the present invention is to provide a method for reacting a $SiO_2$ portion of a dioctahedral or trioctahedral smectite clay-containing composition, under heat and pressure, by dissolving the $SiO_2$ portion of the clay at a pH of about 8.5 to about 10.0, preferably about 9.0 to about 9.5; adding stoichiometric amounts of aluminum, sodium and magnesium to the dissolved $SiO_2$ and clay, preferably in the form of hydroxides or oxides; and reacting the $SiO_2$ with the added metals at a temperature of at least about 150° C. and a pressure of at least about 80 psig to convert the $SiO_2$ to a dioctahedral smectite clay; or adding stoichiometric amounts of lithium, sodium and magnesium to the dissolved $SiO_2$, under the same conditions of temperature and pressure, to convert the $SiO_2$ to a trioctahedral smectite clay.

The above and other aspects and advantages of the present invention will become more apparent from the following detailed description of the preferred embodiments, taken in conjunction with the drawing.

BRIEF DESCRIPTION OF THE DRAWING

FIG. 3 is an x-ray diffraction pattern of a mixture of a dioctahedral smectite clay (montmorillonite) and dissolved $SiO_2$ of Example 4, at various times, during the reaction of $SiO_2$ (Opaline-CT) with lithium, sodium and magnesium to a trioctahedral smectite clay, showing the continuing decrease of $SiO_2$ and the continuing increase of a trioctahedral smectite (hectorite) clay with increased reaction time, over a 24 hour reaction, at a preferred temperature of 235° C. and a preferred pressure of 460 psig.

DETAILED DESCRIPTION OF THE PREFERRED EMBODIMENTS

Figure 1:
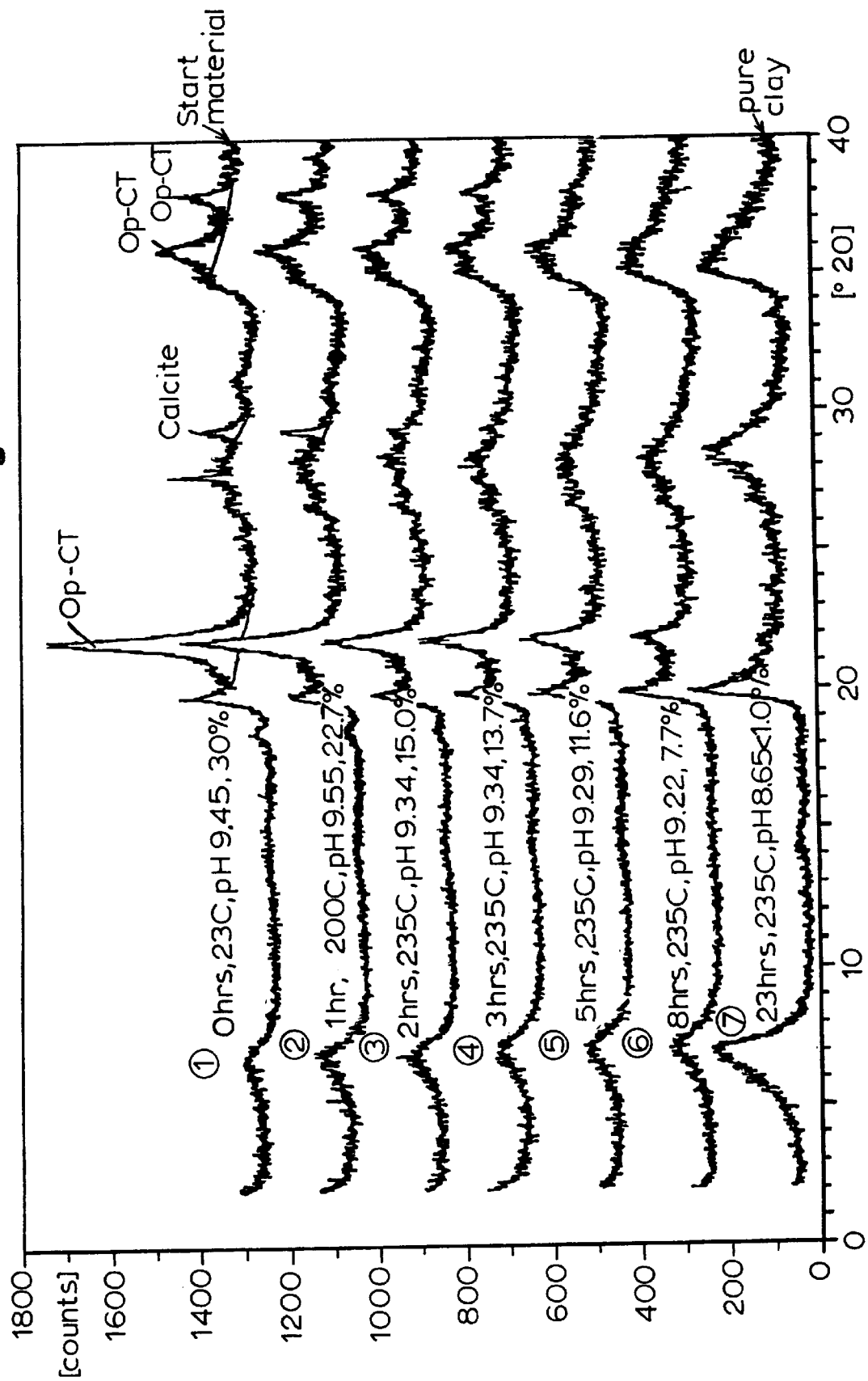
FIG. 1 is an x-ray diffraction pattern of a mixture of a dioctahedral smectite clay (montmorillonite) and dissolved $SiO_2$ of Example 1, at various times, during the reaction of $SiO_2$ (Opaline-CT) with aluminum, sodium and magnesium to a dioctahedral smectite clay, showing the continuing decrease of $SiO_2$ and the continuing increase of a dioctahedral smectite (montmorillonite) clay with increased reaction time, over a 23 hour reaction, at a preferred temperature of 235° C. and a preferred pressure of 460 psig.
Figure 2:
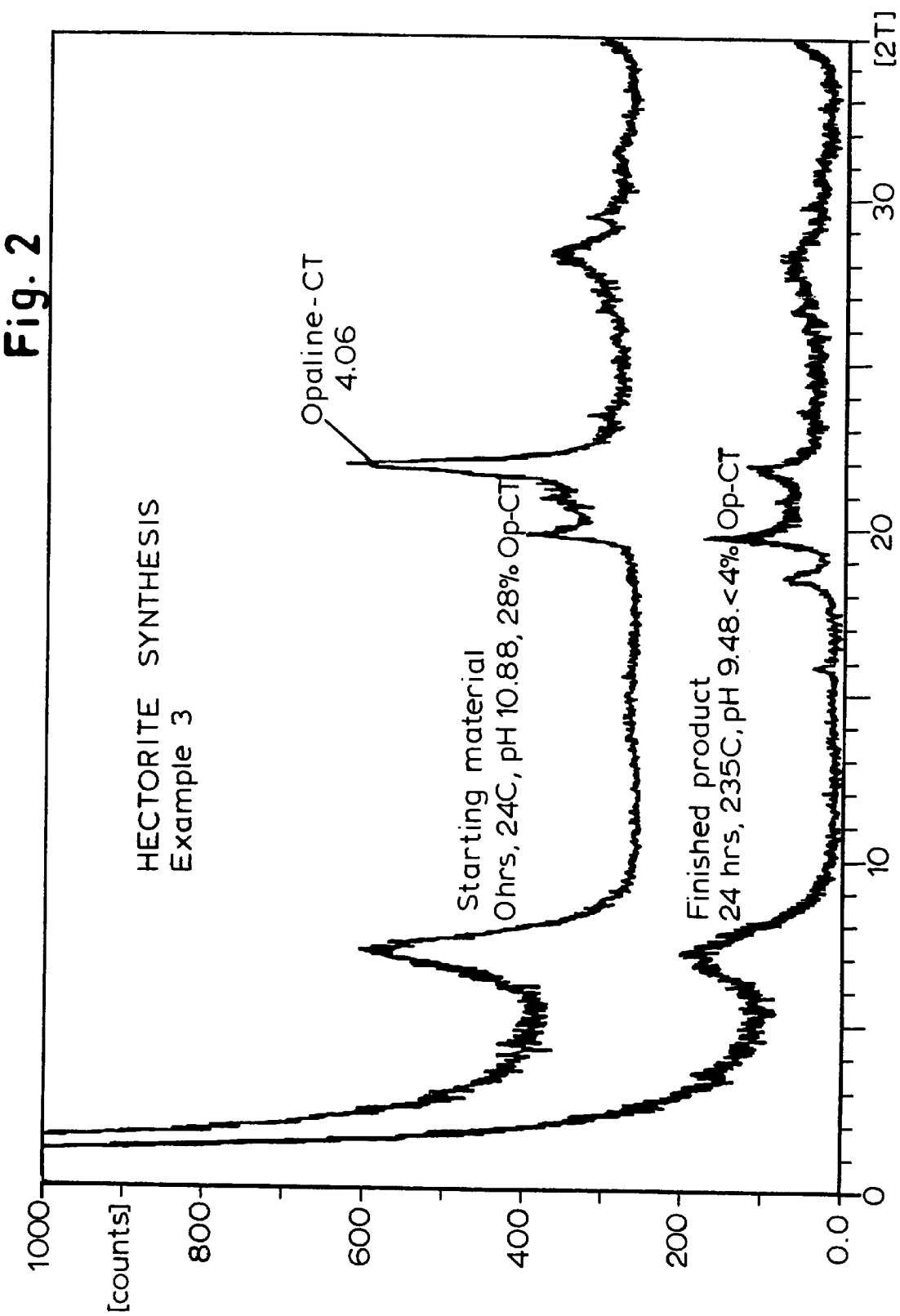
FIG. 2 is an x-ray diffraction pattern of a mixture of a dioctahedral smectite clay (montmorillonite) and dissolved $SiO_2$ of Example 3, at various times, during the reaction of $SiO_2$ (Opaline-CT) with lithium, sodium and magnesium to a trioctahedral smectite clay, showing the continuing decrease of $SiO_2$ and the continuing increase of a trioctahedral smectite (hectorite) clay with increased reaction time, over a 24 hour reaction, at a preferred temperature of 235° C. and a preferred pressure of 460 psig.

The first step in the silica to a dioctahedral or trioctahedral smectite clay conversion is to determine the amount and types of non-clay impurities in the recovered deposit, unless the amounts and types of impurities are known, or unless the starting material is $SiO_2$ (without clay). In accordance with a preferred embodiment of the present invention, a combination of x-ray Diffraction (XRD) and x-ray Fluorescence (XFR) identifies the crystalline non-clay impurities and non-crystalline non-clay impurities in the recovered deposit, as disclosed in co-pending application of Semeon J. Tsipursky, Don D. Eisenhour, Gary W. Beall, Mark Clarey and James Edwards entitled "Method Of Determining The Composition Of A Clay Deposit" (our ref: 28682/10295) filed concurrently herewith, hereby incorporated by reference. XRD identifies the crystalline impurities and estimates the quantity of the crystalline impurities. XRD and XRF, in combination, identify non-crystalline impurities and estimates the quantity of the non-crystalline impurities (non-crystalline, non-clay components of the recovered clay). It has been found that the predominant non-clay, non-crystalline (amorphous) impurity found in the clay deposits is amorphous silica, commonly found in the form of Opaline-CT ($SiO_2 \cdot nH_2O$), wherein n=1 to 80.

Once the quantity and identity of the crystalline and non-crystalline non-clay impurities have been determined, a calculation is performed to determine the amounts of Na, Mg and/or Al that are required in order to provide the stoichiometric quantity of Na, Mg and Al ions to convert the non-clay impurities for reacting the $SiO_2$ to a dioctahedral smectite clay; or the amounts of Li, Mg and Al ions required to react the $SiO_2$ to a trioctahedral smectite clay, such as hectorite. These metals may be added in various forms, such as oxides and/or hydroxides and/or carbonates, and/or acetates. The following examples show the conversion of the most commonly found impurities (crystalline silica and amorphous silica) into montmorillonite clay.

EXAMPLE 1

The following Table 1 details the bulk composition of a recovered bulk clay containing 28% by weight silica impurities and 1% calcite ($CaCO_3$), with the type and quantity of impurities determined from a combination of XRD and XRF, as disclosed in co-pending application of Semeon J. Tsipursky, Don D. Eisenhour, Gary W. Beall, Mark Clarey and James Edwards entitled "Method Of Determining The Composition Of A Clay Deposit" (our ref.: 28682/10295) filed concurrently herewith.

TABLE 1

| Bulk Composition Example Clay #1 | |
|---|---|
| | wt. % |
| O | 50.78 |
| Na | 1.93 |
| Mg | 1.57 |
| Al | 8.71 |
| Si | 35.16 |
| P | 0.04 |
| S | 0.06 |
| K | 0.00 |
| Ca | 0.40 |
| Ti | 0.08 |
| Cr | 0.00 |
| Mn | 0.02 |
| Fe | 1.25 |
| TOTAL | 100.00 |

| Admix. | Impurities wt. % |
|---|---|
| Silica | 28.0 |
| Kaolinite | 0.0 |
| Gypsum | 0.0 |
| Albite | 0.0 |
| Anorthite | 0.0 |
| Orthoclase | 0.0 |
| Apatite | 0.0 |
| Halite | 0.0 |
| Calcite | 1.0 |
| Dolomite | 0.0 |
| Na-carb. | 0.0 |
| Siderite | 0.0 |
| Biotite | 0.0 |
| Muscovite | 0.0 |
| Chlorite | 0.0 |
| Stilbite | 0.0 |
| Pyrite | 0.0 |

To convert the silica impurities to montmorillonite via a hydrothermal reaction, additional oxides and/or hydroxides and/or carbonates of Na, Mg and Al are added, e.g., $Na_2O$, MgO and $Al_2O_3$ such that the final weight ratio of oxides is: $SiO_2$=68.87%, $Al_2O_3$=24.39%, MgO=3.81%, and $Na_2O$=2.93%. In the preferred synthesis procedure, the additional elements are added in the form of hydroxides instead of pure oxides. In this case, the weight ratio of components needed to hydrothermally synthesize dioctahedral montmorillonite is: $SiO_2$=59.64%, $Al(OH)_3$=32.32%, $Mg(OH)_2$=4.77%, and NaOH=3.27%.

Therefore, for 1000 g of the sample, 280 g of $SiO_2$ must be converted to montmorillonite by adding $Al(OH)_3$=90.5 g, $Mg(OH)_2$=13.36 g, and NaOH=9.16 g. A mixture of clay, water, and hydroxides is prepared and then heated to between about 150° C. and about 300° C., preferably between about 185° C. and about 250° C., for 1 to 72 hours, preferably about 10 to about 40 hours, more preferably about 15 to about 30 hours. The silica and hydroxides react to form montmorillonite according to the reaction:

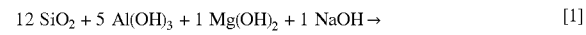

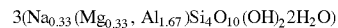 [1]

Rewriting [1] in weight of reactants and reaction products:

 [2]

EXAMPLE 2

The initial composition of the sample of Example 1, to be hydrothermally modified including weight percent of components as oxides, is shown in Table 2:

TABLE 2

Bulk Composition

| Element | wt. % | Oxide | wt. %, as oxide |
|---|---|---|---|
| O | 50.78 | — | — |
| Na | 1.93 | $Na_2O$ | 2.61 |
| Mg | 1.57 | MgO | 2.61 |
| Al | 8.71 | $Al_2O_3$ | 16.52 |
| Si | 35.16 | $SiO_2$ | 75.52 |
| P | 0.04 | $P_2O_5$ | 0.09 |
| S | 0.06 | $SO_2$ | 0.12 |
| K | 0.00 | $K_2O$ | 0.00 |
| Ca | 0.40 | CaO | 0.56 |
| Ti | 0.08 | $TiO_2$ | 0.13 |
| Cr | 0.00 | $Cr_2O_3$ | 0.00 |
| Mn | 0.02 | MnO | 0.03 |
| Fe | 1.25 | $Fe_2O_3$ | 1.79 |
| TOTAL | 100.00 | TOTAL | 100.00 |

Analysis by x-ray diffraction indicates that the only non-clay impurities in the sample are Opaline-CT (amorphous silica) and a trace of calcite. Subtracting out the contributions of Opaline-CT and calcite to the bulk composition gives the composition of the clay component. The amount of calcite and Opaline-CT are estimated by the intensity of the x-ray diffraction pattern that corresponds to these impurities, as shown in FIG. 1. (The reliability of the determination of impurities by x-ray diffraction is cross-checked by the composition of the clay that results when the impurities have been subtracted from the bulk composition). Montmorillonite clay should have 4 tetrahedral cations ($Si^{+4}$, $Al^{+3}$ and $Fe^{+3}$) per formula unit, 2 octahedral cations per formula unit, and a total interlayer charge of between 0.3 and 0.5, as shown in Table 3:

TABLE 3

| Interlayer | | Octahedral | | Tetrahedral | | Anions | |
|---|---|---|---|---|---|---|---|
| $Na^+$ | 0.420 | $Al^{+3}$ | 1.547 | $Al^{+3}$ | 0.068 | O | 10.0 |
| $Mg^{+2}$ | 0.000 | $Fe^{+3}$ | 0.084 | $Si^{+4}$ | 3.932 | OH | 2.0 |
| $K^+$ | 0.000 | $Fe^{+2}$ | 0.037 | $Fe^{+3}$ | 0.000 | b-dimension (1) | |
| $Ca^{+2}$ | 0.000 | $Ti^{+4}$ | 0.008 | | | b(Å) | 8.986 |
| | | $Mg^{+2}$ | 0.323 | | | (020) | 4.493 |
| Mg inter/Mg Tot | | $Mn^{+2}$ | 0.002 | | | (060) | 1.498 |
| 0.00 | | | | | | alpha (1) | |
| | | | | | | deg. | 7.746 |
| | | | | | | Free Swell (a) | |
| Cations | 0.42 | | 2.00 | | 4.00 | w/c (g) | 22.1 |
| Charge | 0.42 | | 5.65 | | 15.93 | Free Swell (b) | |
| CEC | 116 | | 82 | | | w/c (g) | 21.4 |

The composition of the clay after subtracting contributions to the bulk composition from impurities is shown in Table 4:

TABLE 4

| Oxide | wt. % Clay, as oxide, after deleting impurities |
|---|---|
| $Na_2O$ | 3.67 |
| MgO | 3.68 |
| $Al_2O_3$ | 23.24 |
| $SiO_2$ | 66.67 |
| $P_2O_5$ | 0.00 |
| $SO_2$ | 0.00 |
| $K_2O$ | 0.00 |
| CaO | 0.00 |

TABLE 4-continued

| Oxide | wt. % Clay, as oxide, after deleting impurities |
|---|---|
| $TiO_2$ | 0.19 |
| $Cr_2O_3$ | 0.00 |
| MnO | 0.04 |
| $Fe_2O_3$ | 2.53 |
| TOTAL | 100.00 |

Therefore, the bulk starting material can be represented by the sum of the three components (clay, Opaline-CT, calcite); as shown in Table 5:

TABLE 5

| Oxide | Wt. % Clay | Wt. % Opaline-CT | Wt % Calcite* | Bulk Clay |
|---|---|---|---|---|
| $Na_2O$ | 2.61 | 0.00 | 0.00 | 2.61 |
| MgO | 2.62 | 0.00 | 0.00 | 2.62 |
| $Al_2O_3$ | 16.50 | 0.00 | 0.00 | 16.50 |
| $SiO_2$ | 47.42 | 28.00 | 0.00 | 75.42 |
| $P_2O_5$ | 0.00 | 0.00 | 0.00 | 0.00 |
| $SO_2$ | 0.00 | 0.00 | 0.00 | 0.00 |
| $K_2O$ | 0.00 | 0.00 | 0.00 | 0.00 |
| CaO | 0.00 | 0.00 | 0.56 | 0.56 |
| $TiO_2$ | 0.13 | 0.00 | 0.00 | 0.13 |
| $Cr_2O_3$ | 0.00 | 0.00 | 0.00 | 0.00 |
| MnO | 0.03 | 0.00 | 0.00 | 0.03 |
| $Fe_2O_3$ | 1.79 | 0.00 | 0.00 | 1.79 |
| TOTAL | 71.10 | 28.00 | 0.56 | 99.66* |

*Calcite constitutes 1% by weight, but only 0.56% is CaO; the remaining 0.44% is $CO_2$, which brings the total from 99.66% to approximately 100%.

To remove the 28% amorphous $SiO_2$ impurities by hydrothermally converting it to montmorillonite, additional Mg, Al, and Na must be added. The composition of the pure montmorillonite (minus the water) to be synthesized is shown in Table 6:

TABLE 6

| Oxide | wt. % |
|---|---|
| $Na_2O$ | 2.93 |
| MgO | 3.81 |
| $Al_2O_3$ | 24.39 |
| $SiO_2$ | 68.87 |
| TOTAL | 100.00 |

In terms of $SiO_2$, Al, Mg, and Na-hydroxides, the weight ratio is shown in Table 7:

TABLE 7

| Oxide | wt. % |
|---|---|
| NaOH | 3.27 |
| $Mg(OH)_2$ | 4.77 |
| $Al(OH)_3$ | 32.32 |
| $SiO_2$ | 59.64 |
| TOTAL | 100.00 |

For an initial bulk sample weighing 1000 lbs., 280 lbs. is excess $SiO_2$. Therefore, the reaction requires the quantities of Na, Mg and Al shown in Table 8 (in the form of hydroxides or oxides):

TABLE 8

| Oxide | lbs. |
|---|---|
| NaOH | 15.4 |
| Mg(OH)$_2$ | 22.4 |
| Al(OH)$_3$ | 151.7 |
| SiO$_2$ | |
| Bulk clay | 1000 |
| TOTAL | 1189.5 |

The powdered reactants are mixed with water to form a slurry with a total solids content of about 1 to about 25 percent by weight, preferably about 3 to about 25 percent, more preferably about 5 to about 20 percent by weight. The percent solids is primarily limited by the viscosity of the resulting slurry. The hydroxides tend to increase the viscosity of the clay-water slurry significantly so that at high solids content the slurry becomes too viscous to mix during the reaction.

Once the slurry has mixed well (approximately 1 to 3 hours of vigorous mixing), it is placed into a hydrothermal reactor at a pressure of about 200 to about 500 bars, and heated to a desired temperature (in this example, 235° C.). After heating for 24 hours, the reactor was allowed to cool and the slurry was removed from the reactor and dried. The bottom x-ray diffraction pattern of FIG. 1 shows the pure clay produced from the reaction after 23 hours at 235° C., pH=8.65, having less than 1% by weight silica impurities.

The following Examples 3 and 4 detail the process for purifying the same bulk clay sample of Example 1 by the hydrothermal conversion of silica impurities (particularly amorphous silica impurities, since crystalline silica impurities are easier to remove) to hectorite (a trioctahedral smectite clay). Hectorite is synthesized from SiO$_2$ by the addition of at least a stoichiometric amount of sodium, lithium and magnesium to SiO$_2$, at a temperature of about 235° C., and a pH of about 8.5 to about 10.0, and at a pressure in the range of about 80 psig to about 300 psig, preferably about 100 psig to about 280 psig.

EXAMPLE 3

The bulk clay of Example 1 contains 28% by weight silica impurities, mostly in the form of amorphous silica. To convert the silica impurities to hectorite via a hydrothermal reaction, hydroxides of Na, Li and Mg are added such that the final ratio of components is as shown in Table 9:

TABLE 9

| Oxide | wt. % |
|---|---|
| NaOH | 5.13 |
| LiOH · H$_2$O | 5.41 |
| Mg(OH)$_2$ | 37.51 |
| SiO$_2$ | 51.95 |
| TOTAL | 100.00 |

Therefore, for 1,000 g of the sample, 280 g of SiO$_2$ must be converted to hectorite by adding NaOH=14.4 g, LiOH•H$_2$O=1.51 g, and Mg(OH)$_2$=105 g. A mixture of clay, water, and hydroxides is prepared and then heated to about 235° C. for 24 hours. The silica and hydroxides react to form hectorite according to the reaction:

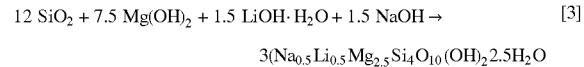

$$12\ SiO_2 + 7.5\ Mg(OH)_2 + 1.5\ LiOH \cdot H_2O + 1.5\ NaOH \rightarrow \quad [3]$$
$$3(Na_{0.5}Li_{0.5}Mg_{2.5}Si_4O_{10}(OH)_2 \cdot 2.5H_2O)$$

Rewriting [3] in weight percent components:

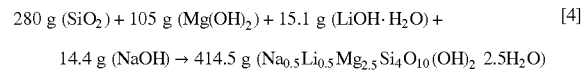

$$280\ g\ (SiO_2) + 105\ g\ (Mg(OH)_2) + 15.1\ g\ (LiOH \cdot H_2O) + \quad [4]$$
$$14.4\ g\ (NaOH) \rightarrow 414.5\ g\ (Na_{0.5}Li_{0.5}Mg_{2.5}Si_4O_{10}(OH)_2 \cdot 2.5H_2O)$$

EXAMPLE 4

This example details the alternate procedure for reacting the silica impurities of the clay of Examples 1–3 to a trioctahedral smectite clay (hectorite) using magnesium acetate instead of magnesium hydroxide as the source of Mg$^{+2}$ ions. Using magnesium acetate improves the solubility of the reactants and, at the same time, inhibits formation of additional impurities, e.g., brucite, Mg(OH)$_2$.

To convert the silica impurities to hectorite via this alternate reaction, hydroxides of Na and Li, and magnesium acetate are added such that the final ratio of components is as shown in Table 10:

TABLE 10

| Oxide | wt. % |
|---|---|
| NaOH | 2.56 |
| LiOH · H$_2$O | 2.70 |
| (CH$_3$COO)$_2$Mg · 4H$_2$O | 68.83 |
| SiO$_2$ | 25.91 |
| TOTAL | 100.00 |

Therefore, for 1,000 g of the sample, 280 g of SiO$_2$ must be converted to hectorite by adding NaOH=7.2 g, LiOH•H$_2$O=7.6 g, and (CH$_3$COO)$_2$Mg•4H$_2$O=192.7 g. A mixture of clay, water, Na and Li-hydroxides, and magnesium acetate is prepared and then heated to about 235° C. for 24 hours. The silica, hydroxides and magnesium acetate react to form hectorite according to the reaction:

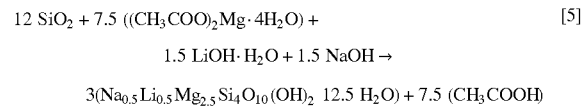

$$12\ SiO_2 + 7.5\ ((CH_3COO)_2Mg \cdot 4H_2O) + \quad [5]$$
$$1.5\ LiOH \cdot H_2O + 1.5\ NaOH \rightarrow$$
$$3(Na_{0.5}Li_{0.5}Mg_{2.5}Si_4O_{10}(OH)_2 \cdot 12.5\ H_2O) + 7.5\ (CH_3COOH)$$

Rewriting [5] in weight percent components:

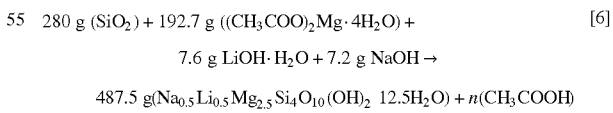

$$280\ g\ (SiO_2) + 192.7\ g\ ((CH_3COO)_2Mg \cdot 4H_2O) + \quad [6]$$
$$7.6\ g\ LiOH \cdot H_2O + 7.2\ g\ NaOH \rightarrow$$
$$487.5\ g(Na_{0.5}Li_{0.5}Mg_{2.5}Si_4O_{10}(OH)_2 \cdot 12.5H_2O) + n(CH_3COOH)$$

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A method of converting an $SiO_2$ portion of a smectite clay to a dioctahedral smectite clay comprising:

mixing the smectite clay and $SiO_2$ portion thereof with water to form a smectite clay/$SiO_2$/$H_2O$ slurry having a pH;

adjusting the pH of the smectite clay/$SiO_2$/$H_2O$ slurry with a pH-adjusting additive to about 8.5 to about 10.0;

heating the smectite clay/$SiO_2$/$H_2O$ slurry to a temperature of at least about 150° C.; and adding, to the smectite clay/$SiO_2$/$H_2O$ slurry, metals, in the form of hydroxides, selected from the group consisting of aluminum hydroxide, lithium hydroxide, sodium hydroxide, magnesium hydroxide, and mixtures thereof in at least stoichiometric amounts to form a reaction mixture for reaction with the $SiO_2$ in a closed reaction vessel, at a temperature of at least 150° C., for a time sufficient to react the added metals with the $SiO_2$ to form a dioctahedral clay such that the weight ratios of the hydroxides, in relation to the weight of $SiO_2$, are at least about:

| | |
|---|---|
| $SiO_2$ = | 59.64% |
| $Al(OH)_3$ = | 32.32% |
| $Mg(OH)_2$ = | 4.77% |
| NaOH = | 3.27%. |

2. A method in accordance with claim 1, wherein the pH of the slurry is adjusted to 9.0 to 9.5.

3. A method in accordance with claim 2, wherein the pH is adjusted by adding NaOH to the slurry.

4. A method in accordance with claim 1, wherein the slurry is heated to a temperature in the range of about 150° C. to about 250° C.

5. A method in accordance with claim 4, wherein the slurry is heated to a temperature in the range of 180° C. to about 250° C.

6. A method in accordance with claim 5, wherein the slurry is heated to a temperature in the range of about 190° C. to about 235° C.

7. A method in accordance with claim 1, wherein the reaction mixture is held at a temperature of at least 150° C. and a pressure in the range of about 80 psig to about 280 psig for a period of time of at least 1 hour.

8. A method in accordance with claim 7, wherein the reaction mixture is held at a temperature in the range of about 150° C. to about 250° C., at a pressure of about 80 psig to about 280 psig, for a period of time of about 1 hour to about 72 hours.

9. A method of converting an $SiO_2$ portion of a smectite clay composition to a dioctahedral smectite clay and $SiO_2$ comprising:

analyzing the clay composition to determine an amount of $SiO_2$ contained in the clay composition;

mixing the clay composition with water to form an aqueous slurry, having a pH, comprising the smectite clay, $SiO_2$ and water;

adjusting the pH of the aqueous slurry, with a pH-adjusting additive, to about 8.5 to about 10.0;

heating the aqueous slurry to a temperature of at least about 150° C. in a pressurized reaction vessel; and adding to the aqueous slurry, a metal selected from the group consisting of aluminum, sodium, magnesium, and mixtures thereof in at least stoichiometric amounts for reaction with the $SiO_2$ to form a dioctahedral smectite clay from the $SiO_2$, at a temperature of at least 150° C.

10. A method in accordance with claim 9, wherein the pH of the aqueous slurry is adjusted to 9.0 to 9.5.

11. A method in accordance with claim 10, wherein the pH is adjusted by adding NaOH to the aqueous slurry.

12. A method in accordance with claim 9, wherein the aqueous slurry is heated to a temperature in the range of about 150° C. to about 250° C.

13. A method in accordance with claim 12, wherein the aqueous slurry is heated to a temperature in the range of 180° C. to about 250° C.

14. A method in accordance with claim 13, wherein the aqueous slurry is heated to a temperature in the range of about 190° C. to about 235° C.

15. A method in accordance with claim 9, wherein the metals are added to the aqueous slurry in the form of hydroxides.

16. A method in accordance with claim 15, wherein the metals are added in at least a stoichiometric amount in accordance with the following reaction:

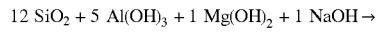

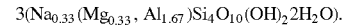

17. A method in accordance with claim 9, wherein the metals are added to the aqueous slurry in stoichiometric amounts such that the weight ratios of the hydroxides, in relation to the weight of $SiO_2$, are at least about:

| | |
|---|---|
| $SiO_2$ = | 59.64% |
| $Al(OH)_3$ = | 32.32% |
| $Mg(OH)_2$ = | 4.77% |
| NaOH = | 3.27% . |

18. A method in accordance with claim 9, wherein the metals are added to the aqueous slurry in the form of oxides.

19. A method in accordance with claim 18, wherein the metals are added in stoichiometric amounts such that the weight ratios of the oxides, in relation to the weight of $SiO_2$, are at least about:

| | |
|---|---|
| $SiO_2$ = | 68.87% |
| $Al_2O_3$ = | 24.39% |
| MgO = | 3.81% |
| $Na_2O$ = | 2.93% . |

20. A method in accordance with claim 9, wherein the aqueous slurry is held at a temperature of at least 150° C. and a pressure of at least 80 psig for a period of time of at least 1 hour.

21. A method of converting an $SiO_2$ portion of a smectite clay composition to a trioctahedral smectite clay comprising:

analyzing the clay composition to determine an amount of non-smectite $SiO_2$ contained in the clay composition;

mixing the clay composition with water to form an aqueous slurry, having a pH, comprising the smectite clay, $SiO_2$ and water;

adjusting the pH of the aqueous slurry, with a pH-adjusting additive, to about 8.5 to about 10.0;

heating the aqueous slurry to a temperature of at least about 150° C. in a pressurized reaction vessel; and adding to the aqueous slurry, a metal selected from the group consisting of lithium, sodium, magnesium, and mixtures thereof in at least stoichiometric amounts for reaction with the $SiO_2$, to form a trioctahedral smectite clay from the $SiO_2$, at a temperature of at least 150° C.

22. A method in accordance with claim 21, wherein the pH of the aqueous slurry is adjusted to 9.0 to 9.5.

23. A method in accordance with claim 22, wherein the pH is adjusted by adding NaOH to the aqueous slurry.

24. A method in accordance with claim 21, wherein the aqueous slurry is heated to a temperature in the range of about 150° C. to about 250° C.

25. A method in accordance with claim 24, wherein the aqueous slurry is heated to a temperature in the range of 180° C. to about 250° C.

26. A method in accordance with claim 25, wherein the aqueous slurry is heated to a temperature in the range of about 190° C. to about 235° C.

27. A method in accordance with claim 21, wherein the metals are added to the aqueous slurry in the form of hydroxides.

28. A method in accordance with claim 21, wherein the metals are added in at least a stoichiometric amount in accordance with the following reaction:

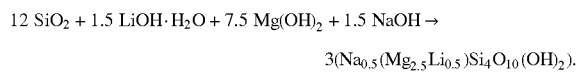

$$12\ SiO_2 + 1.5\ LiOH \cdot H_2O + 7.5\ Mg(OH)_2 + 1.5\ NaOH \rightarrow$$
$$3(Na_{0.5}(Mg_{2.5}Li_{0.5})Si_4O_{10}(OH)_2).$$

29. A method in accordance with claim 21, wherein the metals are added to the aqueous slurry in stoichiometric amounts, as hydroxides, such that the weight ratios of the hydroxides, in relation to the weight of $SiO_2$, are at least about:

| | |
|---|---|
| $SiO_2$ = | 25.91% |
| $LiOH \cdot H_2O$ = | 2.70% |
| $(CH_3COO)_2\ MgH_2O$ = | 68.83% |
| NaOH = | 2.56% . |

30. A method of converting an $SiO_2$ portion of a smectite clay to a dioctahedral smectite clay comprising:

mixing the smectite clay and $SiO_2$ portion thereof with water to form a smectite clay/$SiO_2$/$H_2O$ slurry having a pH;

adjusting the pH of the smectite clay/$SiO_2$/$H_2O$ slurry with a pH-adjusting additive to about 8.5 to about 10.0;

heating the smectite clay/$SiO_2$/$H_2O$ slurry to a temperature of at least 150° C.; and adding, to the smectite clay/$SiO_2$/$H_2O$ slurry, metals, in the form of oxides, selected from the group consisting of aluminum oxide, lithium oxide, sodium oxide, magnesium oxide, and mixtures thereof in at least stoichiometric amounts to form a reaction mixture for reaction with the $SiO_2$ in a closed reaction vessel, at a temperature of at least 150° C., for a time sufficient to react the added metals with the $SiO_2$ to form a dioctahedral clay such that the weight ratios of the oxides, in relation to the weight of $SiO_2$, are at least about:

| | |
|---|---|
| $SiO_2$ = | 68.87% |
| $Al_2O_3$ = | 24.39% |
| MgO = | 3.81% |
| $Na_2O$ = | 2.93% . |

31. A method of converting an $SiO_2$ portion of a smectite clay to a dioctahedral or trioctahedral smectite clay comprising:

mixing the smectite clay and the $SiO_2$ portion thereof with water to form a smectite clay/$SiO_2$/$H_2O$ slurry having a pH;

adjusting the pH of the slurry with a pH adjusting additive to about 8.5 to about 10.0;

heating the slurry to a temperature of at least about 150° C.; and adding, to the slurry, metals selected from the group consisting of aluminum, lithium, sodium, magnesium, and mixtures thereof in at least stoichiometric amounts to form a reaction mixture for reaction with $SiO_2$ in a closed reaction vessel, at a temperature of at least 150° C., for a time sufficient to react the added metals with the $SiO_2$ to form a dioctahedral or trioctahedral smectite clay.

32. A method of converting an $SiO_2$ portion of a smectite clay to a trioctahedral smectite clay comprising:

mixing the smectite clay and the $SiO_2$ portion thereof with water to form a smectite clay/$SiO_2$/$H_2O$ slurry having a pH;

adjusting the pH of the slurry with a pH adjusting additive to about 8.5 to about 10.0;

heating the slurry to a temperature of at least about 150° C.; and adding, to the slurry metal hydroxides selected from the group consisting of lithium hydroxide, sodium hydroxide, magnesium hydroxide, and mixtures thereof in at least stoichiometric amounts to form a reaction mixture for reaction with the $SiO_2$ in a closed reaction vessel, at a temperature of at least 150° C., for a time sufficient to react the added metals with the $SiO_2$ to form a trioctahedral smectite clay such that the weight ratios of hydroxides, in relation to the weight of the $SiO_2$, are at least about:

| | |
|---|---|
| $SiO_2$ = | 51.95% |
| $Mg(OH)_2$ = | 37.51% |
| $LiOH \cdot H_2O$ = | 5.41% |
| NaOH = | 5.13% . |

* * * * *